United States Patent
Schütz et al.

(10) Patent No.: US 12,552,077 B2
(45) Date of Patent: Feb. 17, 2026

(54) METHOD FOR CONTROLLING THE OPERATION OF A DEVICE FOR PRODUCING A PARTICLE FOAM COMPONENT

(71) Applicant: Siegfried Hofmann GmbH, Lichtenfels (DE)

(72) Inventors: Johannes Schütz, Bamberg (DE); Patrick Fischer, Ebersdorf (DE)

(73) Assignee: SIEGFRIED HOFMANN GMBH, Lichtenfels (DE)

( * ) Notice: Subject to any disclaimer, the term of this patent is extended or adjusted under 35 U.S.C. 154(b) by 222 days.

(21) Appl. No.: 18/007,903

(22) PCT Filed: Jun. 2, 2021

(86) PCT No.: PCT/EP2021/064770
§ 371 (c)(1),
(2) Date: Dec. 2, 2022

(87) PCT Pub. No.: WO2021/245126
PCT Pub. Date: Dec. 9, 2021

(65) Prior Publication Data
US 2023/0302693 A1  Sep. 28, 2023

(30) Foreign Application Priority Data
Jun. 3, 2020 (DE) .................. 10 2020 114 781.3

(51) Int. Cl.
*B29C 44/60* (2006.01)
*B29C 44/34* (2006.01)
*B29C 44/44* (2006.01)

(52) U.S. Cl.
CPC .......... *B29C 44/60* (2013.01); *B29C 44/3426* (2013.01); *B29C 44/445* (2013.01)

(58) Field of Classification Search
None
See application file for complete search history.

(56) References Cited

U.S. PATENT DOCUMENTS

| 2005/0230861 A1 | 10/2005 | Takatori et al. |
| 2017/0312953 A1 | 11/2017 | Romanov et al. |

(Continued)

FOREIGN PATENT DOCUMENTS

| AT | 519381 A2 | 6/2018 |
| DE | 102006006345 A1 | 8/2007 |

(Continued)

OTHER PUBLICATIONS

Machine Translation of Oda JP H11277554 A. (Year: 1999).*
(Continued)

*Primary Examiner* — Ryan A Jarrett
(74) *Attorney, Agent, or Firm* — Greenblum & Bernstein, P.L.C.

(57) ABSTRACT

Method for controlling the operation of a device for producing a particle foam component, wherein the device includes at least one function unit, which is controllable during its operation in respect of at least one target value. The method includes selecting, on the basis of at least one selection criterion, of a control parameter set from a data storage unit, in which a plurality of control parameter sets are stored, which each has at least one control parameter for controlling the operation of at least one function unit of the device in respect of at least one target value; and applying the at least one selected control parameter set to control the operation of the device, in particular to control the operation of the function unit of the device affected by the particular control parameter set.

20 Claims, 3 Drawing Sheets

(56) References Cited

U.S. PATENT DOCUMENTS

| | | | |
|---|---|---|---|
| 2019/0070763 A1* | 3/2019 | Altonen | B29C 45/78 |
| 2020/0269485 A1* | 8/2020 | Takeuchi | G06F 3/0482 |

FOREIGN PATENT DOCUMENTS

| | | |
|---|---|---|
| DE | 102013114799 A1 | 6/2015 |
| DE | 102014117332 A1 | 6/2016 |
| DE | 102017131025 A1 | 6/2018 |
| JP | H08252834 A | 10/1996 |
| JP | H11277554 A | 10/1999 |
| JP | 2014144603 A | 8/2014 |

OTHER PUBLICATIONS

Japanese Office Action in related Application No. 2022-574126, dated Dec. 12, 2019 (and translation thereof).

International Search Report issued in International Patent Application No. PCT/EP2021/064770, dated Aug. 5, 2021 (with English translation).

Written Opinion issued in International Patent Application No. PCT/EP2021/064770, dated Aug. 5, 2021 (English translation).

* cited by examiner

METHOD FOR CONTROLLING THE OPERATION OF A DEVICE FOR PRODUCING A PARTICLE FOAM COMPONENT

The invention relates to a method for controlling the operation of a device for producing at least one particle foam component, wherein the device comprises at least one function unit, which is controllable during its operation in respect of at least one target value.

Methods and devices for producing particle foam components by processing expandable or expanded plastic particles of an expandable or expanded plastic particle material are basically known from the prior art in a plurality of different embodiments.

Control of the operation of representative devices has taken place hitherto typically on the basis of a standardized control parameter set, in which at least one fixedly defined control parameter is contained for controlling the operation of at least one function unit of a corresponding device, such as e.g. a pressure limiting device or an actuating device assigned to such a device, in respect of at least one target value. This control parameter set is defined independently of specific plant engineering or process engineering configurations, i.e. e.g. independently of the size of a mold associated with a corresponding device, independently of the specific process parameters, such as e.g. pressure, temperature etc., and then used to control the operation of corresponding devices.

Although suitable standardized control parameter sets are typically selected such that these can be used for different molds and process steps, control of the operation of representative devices, e.g. on account of different mold sizes, process parameters, etc., on the basis of suitable standardized control parameter sets regularly takes place using control parameters that could be improved, e.g. because control processes take place in a substantially delayed manner.

The object of the invention is to specify a method that is improved compared with this for controlling the operation of a device for producing a particle foam component.

The object is achieved by the subject matters of the independent claims, i.e. in particular by a method according to the independent claim 1. The dependent claims hereto relate to possible embodiments of the subject matters of the independent claims.

A first aspect of the invention relates to a method for controlling the operation of a device for producing at least one particle foam component, wherein the device comprises at least one function unit, which is controllable during its operation in respect of at least one target value. The method is therefore a control method, which enables control of the operation of at least one function unit, which is controllable during its operation in respect of at least one target value, of a device for producing a particle foam component.

A device controllable or controlled according to the method is configured to process expandable or expanded plastic particles ("plastic particles") of at least one expandable or expanded plastic particle material ("plastic particle material"), such as e.g. polypropylene (PP or EPP), expanded and/or expandable polyamide (PA or EPA), expanded and/or expandable polystyrene (PS or EPS) and expanded and/or expandable thermoplastic elastomer (TPE) to produce particle foam components. A representative device can be implemented in particular for executing one or more work processes for processing plastic particles of at least one plastic particle material for producing a particle foam component. To execute particular work processes, the device comprises one or more function units, which are controllable during their operation in respect of at least one target value.

A specific example of a function unit of the device that is controllable during its operation in respect of at least one target value is an actuating device comprising at least one actuator element transferable to a first state, in particular to a first orientation and/or position, and at least one other state, in particular to at least one other orientation and/or position. A relevant actuating device can form a pressure limiting or valve device or a constituent of such a device.

The term "work process" basically includes any process executable by means of the device, which process is related directly or indirectly to the processing of plastic particles of at least one plastic particle material to produce a particle foam component. As indicated below, work processes are in particular processing steps in which (actual) processing of plastic particles takes place, i.e. in particular a combining of plastic particles to form a particle foam component to be produced, or provision processes in which a quantity of plastic particles, in particular a quantity of plastic particles to be processed in a processing step, is provided, or conveying processes, in which a quantity of plastic particles, in particular a quantity of plastic particles to be processed in a processing step, is conveyed along a conveying line, or filling processes, in which a quantity of plastic particles, in particular a quantity of plastic particles to be processed in a processing step, is poured into a mold cavity of a mold.

As part of a processing step, at least one work or process medium can be applied or used. A work or process medium can be an in particular liquid, vaporous or gaseous energy carrier medium, i.e. e.g. a fluid, i.e. in particular water, steam, i.e. in particular hot steam, or a gas, which absorbs or releases energy, i.e. in particular thermal energy, kinematic energy, in the course of operation of the device.

In all embodiments of the method, control is to be understood in principle as the implementation of a control loop, within which target value information (a reference variable) describing a target value is compared with actual value information (control variable) describing an actual value and from the comparison between the actual value described by the respective actual value information and the target value described by the respective target value information, difference information describing a difference between the particular actual value and the particular target value is determined, from which difference information in turn manipulated variable information describing a manipulated variable is determined, which manipulated variable information minimizes a difference, described by the difference information, between the actual value and the particular target value.

Control of the operation of the device here aims to influence operating parameters or control variables of the device that is to be controlled or is controlled, i.e. e.g. plant engineering or process engineering parameters, such that one or more target values can be adhered to as well as possible even in the event of disturbance influences or disturbance variables.

An example of a representative operating parameter or a representative control variable is e.g. the pressure inside a process chamber through which a process fluid can flow and/or which can be filled by a process fluid and/or inside a process chamber of the device through which plastic particles can flow and/or which can be filled by plastic particles. Other plant or process engineering parameters can naturally also be used as an operating parameter or control variable.

Control according to the method of the operation of a representative device is typically executed by a control device implemented via hardware and/or software. A suitable control device is therefore configured for controlling the operation of a representative device. A suitable control device can execute control on the basis of one or more control parameters and accordingly have one or more control parameters. One example of a control device is a PID control device (PID controller), which has a P, D and I component or parameter as control parameters.

The steps of the method are explained in greater detail below:

In a first step of the method, selection takes place, on the basis of at least one selection criterion, of a control parameter set in which at least one control parameter is contained for controlling the operation of at least one function unit of the device in respect of at least one target value, from a data storage unit in which a plurality of control parameter sets, each comprising at least one control parameter for controlling the operation of at least one function unit of the device in respect of at least one target value, are saved or stored. In the first step of the method, at least one selection criterion is therefore used to make a selection of at least a certain control parameter set from a plurality of control parameter sets saved or stored in a data storage unit, which sets each comprise at least one control parameter for controlling the operation of at least one function unit of the device in respect of at least one target value.

According to the method, a plurality of control parameter sets are therefore provided via a suitable data storage unit and the possibility exists of choosing, on the basis of one or more selection criteria, at least a certain control parameter set from the control parameter sets saved or stored in the data storage unit. The control parameter sets saved or stored in the data storage unit and thus provided via the data storage unit typically contain in each case a predefined number of predefined control parameters and thus define a certain control response of at least one variable to be controlled. In particular, the control parameter sets saved or stored in the data storage unit respectively include at least three control parameters, which can be e.g. a P, D and I component or parameter.

It is possible that at least one dedicated control parameter set is selected for each work process of the device. It is also conceivable, however, that at least one control parameter set is selected for a plurality of work processes of the device.

Selection of at least one suitable control parameter set therefore takes place typically prior to execution of a particular work process of a corresponding device. In particular, the selection of at least one suitable control parameter set can take place during set-up of a corresponding device.

In a second step of the method, the at least one selected control parameter set is applied to control the operation of the device, in particular to control the operation of the function unit of the device affected by the particular control parameter set. In the second step of the method, the at least one control parameter set selected in the first step is therefore applied to control the operation of the device, in particular to control the operation of the function unit of the device affected by the particular control parameter set, and is thus taken as the basis for controlling the operation of the function unit of the device affected by the particular control parameter set. This can take place e.g. in such a way that the at least one selected control parameter set is data-processed by a control device controlling the operation of the respective function unit of the device to control the operation of the function unit of the device affected by the particular control parameter set.

The method is therefore characterized in that control parameter sets or control parameters can be selected targetedly for at least one plant or process engineering configuration, i.e. e.g. for certain mold sizes, for certain process parameters etc., in that based on a selection criterion, which is typically defined in respect of at least one plant or process engineering configuration, at least a certain control parameter set is selected from a data storage unit and taken as the basis for the operation of the function unit(s) of the device affected by the particular control parameter set. According to the method, an individual or tailored control response in respect of certain plant or process engineering configurations can thus be realized due to targeted selection of certain control parameter sets. The control response, i.e. in particular the aspect of how a control device behaves in relation to a certain control task of a device that is to be controlled or is controlled according to the method or of a function unit of such a device, can therefore be significantly improved by targeted selection of at least one control parameter set suitable for certain plant or process engineering configurations and corresponding application of the selected control parameter set, so that on the whole an improved method for controlling the operation of a device for producing a particle foam component exists.

According to the method, prior to selection of the control parameter set, provision or definition of at least one selection criterion can take place. Here a selection criterion can be used, for example, i.e. in particular provided or defined, which relates to a parameter of the device, and/or relates to a parameter of the production process to be implemented by means of the device, and/or relates to a parameter of the plastic particle material to be processed by means of the device. The selection of at least one control parameter set taking place in the first step can therefore take place e.g. taking into consideration a parameter of the device, and/or a parameter of the production process to be implemented by means of the device, and/or a parameter of the plastic particles to be processed by means of the device. This enables control of the operation of the device, i.e. in particular of a particular function unit or units of the device that is/are affected by the particular control parameter set, to be realized in a manner adapted in respect of specific plant or process engineering configurations.

For example, the mass and/or inertia and/or the material of the device or of a mold associated with the device can be used as a parameter of the device. Selection of a certain control parameter set can therefore take place based on the mass and/or inertia of the device or of a mold associated with the device. Alternatively or in addition, e.g. the thermal properties, in particular the thermal capacity, of the device or of a mold associated with the device can be used as parameters of the device. Selection of a certain control parameter set can therefore take place based on the thermal properties, in particular the thermal capacity, of the device or of a mold associated with the device. Alternatively or in addition, e.g. a volume of a process chamber of the device can be used as a parameter of the device. Selection of a certain control parameter set can consequently take place based on a volume of a process chamber of the device. Alternatively or in addition, the geometric shape of a process chamber of the device—this applies in particular also in respect of the inflow and/or through-flow and/or discharge characteristics into, through or out of a process chamber of the device—can be used as a parameter of the device.

Selection of a certain control parameter set can therefore take place based on the geometric shape of a process chamber of the device. A process chamber of the device in all embodiments can be e.g. a mold cavity of a mold associated with the device, a process fluid supply device associated with a corresponding mold, such as e.g. a steam chamber, via which a process fluid can be introduced into a mold cavity of the mold, a process fluid generating device, such as e.g. a steam generating device, via which a process fluid such as e.g. steam can be produced, or a plastic particle and/or process fluid line of a plastic particle and/or process fluid conducting device associated with the device, in particular with a mold of the device.

At least one chemical and/or physical process parameter, in particular a process temperature, a process pressure, a process humidity, a process atmosphere and/or a number of cycles can be used as a parameter of the production process to be implemented by means of the device. Selection of a certain control parameter set can therefore take place on the basis of at least one chemical and/or physical process parameter and/or a number of cycles.

At least one chemical and/or physical material parameter, in particular the chemical composition, the particle size and/or shape, the density, the temperature, the moisture content, the flow properties, in particular in a conveying or transport flow, can be used as a parameter of the plastic particles to be processed by means of the device. Selection of a certain control parameter set can consequently take place on the basis of at least one chemical and/or physical material parameter.

According to the method, prior to selection of the at least one control parameter set and if applicable prior to provision of at least one selection criterion, provision can take place of a data storage unit, in which a plurality of control parameter sets, each comprising at least one control parameter for controlling the operation of at least one function unit of the device in respect of at least one target value, are saved or stored.

The method can also comprise changing or adapting at least one control parameter set saved or stored in the data storage unit. According to the method, changes or adaptations of at least one control parameter set saved or stored in the data storage unit can therefore take place and/or changed or adapted control parameter sets can be saved or stored in the data storage unit. Suitable changes or adaptations can be carried out e.g. on the basis of or taking into consideration measurement or sensor values of certain process parameters, signs of wear of certain function units etc. Suitable measurement or sensor values can be taken from the operation of the device to be controlled according to the method or from another device for producing a particle foam component, in particular a device for producing a particle foam component that is configured similarly or identically to the device to be controlled according to the method. It is also conceivable that appropriate measurement or sensor values can be taken from at least one local or global database unit, so that if applicable external data also can be used to change or adapt at least one control parameter set saved or stored in the data storage unit. No limits are thus set on the realization of an individual or tailored control response in respect of certain plant or process engineering configurations.

According to the method, at least one control parameter set can be saved or stored and accordingly selected and applied, which relates to an operating parameter of at least one function unit of the device as control parameter, and/or which relates to a process parameter of at least one work process to be implemented by means of the device as control parameter (first control parameter set below). Depending on the specific implementation of a function unit of the device to be controlled during its operation, a suitable operating parameter can be, for example, a force or power to be produced via the function unit or a movement of the function unit resulting from this. Thus e.g. a force and/or power production or a movement of a function unit of the device can be controlled specifically on the basis of a first control parameter set. For example, at least one movement parameter or a movement function or characteristic curve, progressing e.g. in a ramp-like manner, of a movably mounted function unit or of a function element of such a unit and/or a drive parameter or a drive function, progressing e.g. in a ramp-like manner, in particular an actual position parameter, of a function unit or of a drive device of such a unit can thus be used as an operating parameter of at least one function unit of the device. A suitable drive parameter or a suitable drive function can also go together with a certain power or power take-up of a function unit that is controllable during its operation. Conceivable in this connection is e.g. a drive or conveying output of a drive or conveying device, such as e.g. a screw conveyor, delivery pump etc., wherein e.g. which start-up ramps are implemented between two power levels, such as e.g. between two speeds, can be controlled via a corresponding first control parameter set.

Alternatively or in addition, according to the method at least one control parameter set, which relates to a higher-level target value setting (second control parameter set below), can be saved or stored in the data storage unit and accordingly selected and applied. Such a control parameter set serves thus not to control the actual operation of a function unit of the device, but a higher-level target value setting, which is taken as the basis for the actual control of the operation of a function unit of the device.

It is therefore possible for the specific example of pressure control in a mold cavity of a mold of the device that in the case of a pressure difference between an actual value and a target value, a higher-level target value setting is defined via a second control parameter set, in particular based purely on software, for a pressure limiting device as an example of a function unit of the device, and the actual control e.g. of the movement of the pressure limiting device, i.e. e.g. of a movably mounted pressure limiting element of the pressure limiting device, is carried out via a first control parameter set. In connection with the above example of a function unit of the device in the form of a drive or conveying device that is controllable during its operation, the dynamics with which control from an actual value to a target value is to take place can be defined e.g. at a higher level via a corresponding second control parameter set, and the actual operation of the drive or conveying device can be controlled via a corresponding first control parameter set on the basis of the dynamics set via the first second control parameter set.

In principle, the method can include setting of at least one item of target value information, which affects control of the operation of at least one function unit of the device that is controllable during its operation and which describes at least one target value, in particular information in the form of an e.g. pressure-, temperature- or time-dependent target value function or curve, and application of the target value information for controlling the operation of or for operating the device, in particular for controlling the operation of or for operating the function unit of the device affected by the particular target value information. Temporary circumvention of control is possible in such a way e.g. for certain work processes, such as e.g. rapid filling of a mold cavity of a mold of the device with plastic particles and/or a process fluid, in which filling process e.g. the speed is significant. This can be carried out in particular for repetitive work processes such as e.g. suitable filling processes.

A suitable item of target value information can be determined e.g. on the basis of information determined by measuring processes of the target value described by the particular target value information and/or on the basis of information determined by calculation and/or simulation processes of the target value described by the particular target value information and/or on the basis of information taken from an external database. Suitable calculation and/or simulation processes can be carried out on the basis of plant or process engineering parameters.

As mentioned further above, an actuating device comprising at least one actuator element transferable to a first state, in particular to a first orientation and/or position, and to at least one other state, in particular to at least one other orientation and/or position, can be used as a function unit of the device. Such an actuating device can be e.g. a drive device or form part of such a device, can be a pressure limiting device, such as e.g. a valve device or can form part of such a device, can be a tool device or form part of such a device etc.

It further applies to all embodiments of the method that the selection of the at least one control parameter set, in particular by a user, can take place manually and/or can be performed by a selection device implemented via hardware and/or software, at least in a partially automated manner, if applicable in a fully automated manner. Suitable partially automated, if applicable fully automated, selection of a corresponding control parameter set is therefore also possible in respect of at least partially automated, if applicable fully automated, operation of a corresponding device. A user and/or data interface implemented via hardware and/or software can be used to make an appropriate selection of a particular control parameter set. A corresponding user and/or data interface can form part of the control device, the data storage unit or an external data processing device. A mobile terminal such as e.g. a smartphone, tablet, laptop etc. of a user can also be understood as an external data processing device.

It applies to all embodiments of the method, furthermore, that the application of the selected control parameter set by a user can take place manually and/or can be performed by a selection device implemented via hardware and/or software, at least in a partially automated manner, if applicable in a fully automated manner. Suitable partially automated, if applicable fully automated, application of a corresponding control parameter set is consequently also possible in respect of at least partially automated, if applicable fully automated, operation of the device.

It applies to all embodiments of the method, furthermore, that the control parameter sets can or will be able to be saved or stored in the data storage unit classified according to at least one classification criterion. The control parameter sets can be present in the data storage unit, therefore, classified according to at least one classification criterion in the sense of the database, which enables simplified location of a control parameter set suitable for certain plant and process engineering configurations and thus a simplified selection of one or more control parameter sets. Classification can take place on the basis of one or more classification criteria; in this case—analogous to the selection criteria—e.g. classification criteria can be used which relate to a parameter of the device, and/or which relate to a plant and/or process engineering parameter of the production process to be implemented by means of the device, and/or which relate to a parameter of the particle foam material to be processed by means of the device. Work process information and/or target value information can likewise be used as classification criteria.

It applies to all embodiments of the method, furthermore, that a suitable data storage unit can be any local or global data storage unit, i.e. e.g. cloud storage. According to the method, an internal data storage unit can therefore be used; a data storage unit of this kind is typically fixedly associated with at least a certain device, so that the control parameter sets stored in the internal data storage unit can be assigned directly to the device. Alternatively or in addition, an external data storage unit can be used; such a data storage unit is typically not fixedly associated with a certain device, so that the control parameter sets stored in the external data storage unit can be assigned to a device via a data connection between the device and the external data storage unit. A data storage unit can comprise one or more volatile or non-volatile data memories in all embodiments.

A second aspect of the invention relates to a device for producing a particle foam component. The device, which can also be termed a molding machine, comprises at least one function unit controllable during its operation in respect of at least one target value, at least one data storage unit, in which a plurality of control parameter sets is stored, each comprising at least one control parameter for controlling the operation of at least one function unit of the device in respect of at least one target value; and at least one control device for applying at least one control parameter set selected from the data storage unit for controlling the operation of the device, in particular for controlling the operation of the function unit of the device affected by the particular control parameter set. As mentioned, an external data storage unit can also be used as a data storage unit, so that this represents an optional component of the device.

A third aspect of the invention relates to a system for controlling the operation of a device for producing a particle foam component, wherein the device comprises at least one function unit controllable during its operation in respect of at least one target value. The system comprises at least one device for producing a particle foam component, wherein the device comprises at least one function unit controllable during its operation in respect of at least one target value; at least one data storage unit, in which a plurality of control parameter sets is stored, each comprising at least one control parameter for controlling the operation of at least one function unit of the device in respect of at least one target value; and at least one control device for applying at least one control parameter set selected from the data storage unit for controlling the operation of the device, in particular for controlling the operation of the function unit of the device affected by the particular control parameter set.

The system can be configured to carry out control of the operation of a plurality of devices or of individual, several or all function units of different devices. Control of the operation of particular devices or function units can take place dependent on or independently of one another.

All implementations in connection with the method according to the first aspect of the invention apply by analogy to the device according to the second aspect of the invention and/or to the system according to the third aspect of the invention and vice versa.

Figure 1:
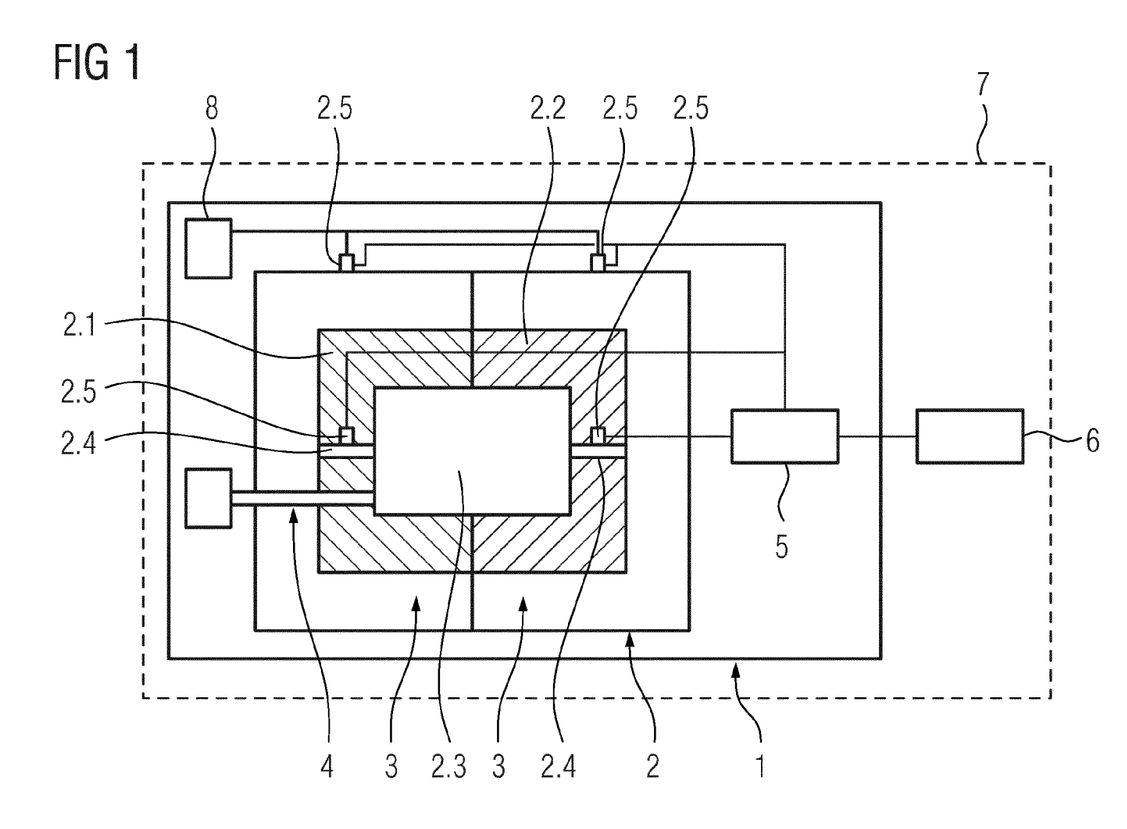
FIG. 1 a schematic representation of a device for producing a particle foam component according to an exemplary embodiment.

The invention is explained in greater detail on the basis of exemplary embodiments in the drawings. These show:

FIG. 1 shows a schematic representation of a device 1 for producing a particle foam component according to an exemplary embodiment.

The device 1, also termed a molding machine, is configured to process expandable or expanded plastic particles of at least one expandable or expanded plastic particle material for producing particle foam components. The device 1 is configured here to carry out one or more work processes for processing plastic particles of at least one plastic particle material for producing a particle foam component.

The term "work process" basically includes any process executable by means of the device 1, which process is related directly or indirectly to the processing of plastic particles of at least one plastic particle material for producing a particle foam component. Work processes are in particular processing steps in which (actual) processing of plastic particles, i.e. in particular a combining of plastic particles, takes place to form a particle foam component to be produced, or provision processes, in which a quantity of plastic particles is provided, in particular a quantity of plastic particles to be processed in a processing step, or conveying processes, in which a quantity of plastic particles, in particular a quantity of plastic particles to be processed in a processing step, is conveyed along a conveying line, or filling processes, in which a quantity of plastic particles, in particular a quantity of plastic particles to be processed in a processing step, is poured into a mold cavity 2.3 of a mold 2 of the device 1.

As part of the processing step, at least one work or process medium can be applied or used. A work or process medium can be an in particular liquid, vaporous or gaseous energy carrier medium, i.e. e.g. a fluid, i.e. in particular water, steam, i.e. in particular hot steam, or a gas, which absorbs or releases energy, i.e. in particular thermal energy, kinematic energy, in the context of operation of the device.

To carry out particular work processes, the device 1 comprises one or more function units, which are controllable during their operation in respect of at least one target value.

A specific example of a function unit of the device 1 that is controllable during its operation in respect of at least one target value is an actuating device comprising at least one actuator element transferable to a first state, in particular to a first orientation and/or position, and at least one other state, in particular to at least one other orientation and/or position. A corresponding actuating device can form a pressure limiting device 2.5, which is explained in greater detail further below, or form a constituent of such a device.

The device 1 comprises as exemplary parts the mold 2 already mentioned, which comprises two mold bodies 2.1, 2.2 mounted movably relative to one another via a drive device, which is not shown, for transferring the mold 1 to a closed position shown in FIG. 1 and to an open position not shown in FIG. 1. In the closed position, the two mold bodies 2.1, 2.2 evidently delimit or define a mold cavity 3.

The mold cavity 3 can be filled via a filling device 4, indicated purely schematically, with expandable or expanded plastic particles of one or more expandable or expanded plastic particle materials to be processed by means of the device 1 to produce a particle foam component.

The mold bodies 2.1, 2.2 are provided with duct-like or duct-shaped openings 2.4, via which in operation of the device a typically temperature-controlled process fluid, such as e.g. steam or hot steam, can be introduced into the mold cavity 2.3, in order to combine the plastic particles poured into the mold cavity 2.3 with one another, forming the particle foam component to be produced.

The process fluid is provided to the device 1 via a process fluid generating device 8, e.g. in the form of a steam generator, as an example of a process chamber of the device 1. The process fluid generating device 8 is configured to provide the generated process fluid to a process fluid supply device 3, e.g. in the form of a steam chamber, associated with the mold cavity 2.3 of the mold 2, as another example of a process chamber of the device 1. The process fluid supply device 3 can surround the mold 2 at least in sections and communicate with the openings 2.4. A corresponding process fluid generating device 8 can constitute a purely functional component or a structural part of the device 1.

The process fluid supply device 3 and/or the openings 2.4 are associated with pressure limiting devices 2.5—these can be formed specifically e.g. as valve devices or can comprise such devices—via which a certain pressure level can be set inside the process fluid supply device 3 and/or the mold cavity 2.3. As mentioned, the pressure limiting devices 2.5 represent exemplary function units of the device 1, which are controllable during their operation in respect of at least one target value.

In principle, suitable pressure limiting devices 2.5 can be arranged so that the pressure can be set via these inside at least one following process chamber of the device 1, so that the arrangement shown in the figure is to be understood purely by way of example. In particular, the pressure limiting devices 2.5 associated with the openings 2.4 should be understood as optional.

The device 1 comprises a control device 5 implemented via hardware and/or software. The control device 5 can comprise one or more controllers implemented via hardware and/or software. The control device 5 is configured to control the operation of function units of the device 1, which are controllable during their operation in respect of at least one target value, on the basis of one or more control parameters. The control device 5 is thus e.g. configured to control the operation of the pressure limiting devices 2.5, which as mentioned represent exemplary function units of the device 1, which are controllable during their operation in respect of at least one target value.

The control device 5 can be configured e.g. as a PID control device (PID controller), which has a P, D and I component or parameter as control parameters.

The device 1 shown in FIG. 1 can form part of a system 7 superordinate to the device 1 for controlling the operation of at least one device 1 for producing a particle foam component.

Using the configuration of the device 1 shown by way of example in FIG. 1, a method can be implemented for controlling the operation of a device 1 for producing a particle foam component. An exemplary embodiment of a corresponding method is explained by way of example below.

The method serves accordingly to control the operation of a device 1 as shown in FIG. 1 for producing a particle foam component, wherein the device 1 comprises at least one function unit controllable during its operation in respect of at least one target value. The method is thus a control method, which enables control of the operation of at least one function unit of a device 1 for producing a particle foam component, which unit is controllable during its operation in respect of at least one target value.

Control of the operation of the device 1 aims here to influence operating parameters or control variables of the device 1 that is to be controlled or is controlled, i.e. e.g. plant or process engineering parameters, in such a way that one or more target values are adhered to as well as possible even under disturbance influences or disturbance variables. A specific example of a relevant operating parameter or a control variable is e.g. the pressure inside a process chamber of the device 1; i.e. the mold cavity 2.3 of the mold 2 of the device 1. Other plant or process engineering parameters can naturally also be used as operating parameter or control variable.

The steps of an exemplary embodiment of the method are explained in greater detail below:

In a first step of the method, selection takes place, on the basis of at least one selection criterion, of a control parameter set, in which at least one control parameter is contained for controlling the operation of at least one function unit of the device 1 in respect of at least one target value, from a data storage unit 6, in which a plurality of control parameter sets, each comprising at least one control parameter for controlling the operation of at least one function unit of the device 1 in respect of at least one target value, are saved or stored. In the first step of the method, at least one selection criterion is therefore used to make a selection of at least a certain control parameter set from a plurality of control parameter sets saved or stored in a data storage unit 6, which sets each comprise at least one control parameter for controlling the operation of at least one function unit of the device 1 in respect of at least one target value. According to the method, a plurality of control parameter sets is therefore provided via a corresponding data storage unit 6 and the possibility exists of choosing, on the basis of one or more selection criteria, at least a certain control parameter set from the control parameter sets provided via the data storage unit 6. The control parameter sets saved or stored in the data storage unit 6 and thus provided via the data storage unit typically contain in each case a predefined number of predefined control parameters and thus define a certain control response of at least one control variable to be controlled, such as e.g. the pressure inside a process chamber of the device 1. It is possible that at least one dedicated control parameter set is selected for each work process of the device 1. It is also conceivable, however, that at least one control parameter set is selected for a plurality of work processes of the device 1.

The selection of the at least one control parameter set, in particular by a user, can take place manually and/or can be performed by a selection device implemented via hardware and/or software, at least in a partially automated manner, if applicable in a fully automated manner. Suitable partially automated, if applicable fully automated, selection of a corresponding control parameter set is thus also possible in respect of at least partially automated, if applicable fully automated, operation of a corresponding device. A user and/or data interface implemented via hardware and/or software can be used in all cases to make a suitable selection of a particular control parameter set. A corresponding user and/or data interface can form part of the control device, the data storage unit or an external data processing device. A mobile terminal such as e.g. a smartphone, tablet, laptop etc. of a user can also be understood as an external data processing device.

The selection of at least one suitable control parameter set therefore takes place typically prior to execution of a particular work process of a corresponding device 1. In particular, the selection of at least one suitable control parameter set can take place during set-up of a corresponding device 1.

A suitable data storage unit 6 can be any local or global data storage unit, i.e. e.g. cloud storage. An internal data storage unit 6 that is fixedly associated with the device 1 can therefore be used according to the method, so that the control parameter sets stored in the internal data storage unit 6 can be assigned directly to the device 1. Alternatively or in addition, an external data storage unit 6 that is not fixedly associated with any device 1 can be used, so that the control parameter sets stored in the external data storage unit 6 can be assigned to a device via a data connection between the device 1 and the external data storage unit 6.

The control parameter sets can or will be able to be saved or stored in the data storage unit 6 classified according to at least one classification criterion. The control parameter sets can be present in the data storage unit 6 thus classified in the sense of the database according to at least one classification criterion, which enables simplified location of a control parameter set suitable for certain plant and process engineering configurations and thus a simplified selection of one or more control parameter sets. Classification can take place on the basis of one or more classification criteria; in this case-analogous to the selection criteria—e.g. classification criteria can be used which relate to a parameter of the device 1, and/or which relate to a plant and/or process engineering parameter of the production process to be implemented by means of the device 1, and/or which relate to a parameter of the plastic particle material to be processed by means of the device 1. Work process information and/or target value information can likewise be used as classification criteria.

In a second step of the method, the at least one selected control parameter set is applied to control the operation of the device 1, i.e. in particular to control the operation of the function unit of the device 1 affected by the particular control parameter set. In the second step of the method, the at least one control parameter set selected in the first step is therefore applied to control the operation of the device 1, i.e. in particular to control the operation of the function unit of the device 1 affected by the particular control parameter set and is thus taken as the basis for controlling the operation of the function unit of the device 1 affected by the particular control parameter set. This can take place e.g. in such a way that the at least one selected control parameter set is data-processed by the control device 5 to control the operation of the function unit of the device 1 affected by the particular control parameter set.

The selected control parameter set can be applied manually by a user and/or by a selection device implemented via hardware and/or software at least in a partially automated manner, if applicable in a fully automated manner. Suitable partially automated, if applicable fully automated, application of a corresponding control parameter set is therefore also possible in respect of at least partially automated, if applicable fully automated operation of the device 1.

The method is thus characterized in that control parameter sets or control parameters can be selected targetedly for at least one plant or process engineering configuration, i.e. e.g. for certain mold sizes, for certain process parameters etc., in that based on a selection criterion, which is typically defined in respect of at least one plant or process engineering configuration, at least one defined control parameter set is selected from a data storage unit 6 and taken as the basis for the operation of the function unit(s) of the device 1 affected by the respective control parameter set. According to the method, an individual or tailored control response in respect of certain plant or process engineering configurations can therefore be realized by targeted selection of certain control parameter sets. The control response, i.e. in particular the aspect of how a control device behaves in relation to a certain control task of a function unit that is to be controlled or is controlled according to the method, can therefore be significantly improved by targeted selection of at least one control parameter set suitable for certain plant or process engineering configurations and corresponding application of the selected control parameter set.

According to the method, prior to selection of the control parameter set, provision or definition of at least one selection criterion can take place. Here a selection criterion can be used, for example, i.e. in particular provided or defined, which relates to a parameter of the device 1, and/or relates to a parameter of the production process to be implemented by means of the device 1, and/or relates to a parameter of the plastic particle material to be processed by means of the device 1. The selection taking place in the first step of at least one control parameter set can therefore take place e.g. taking into consideration a parameter of the device 1 and/or a parameter of the production process to be implemented by means of the device 1, and/or a parameter of the plastic particles to be processed by means of the device 1. This facilitates the realization of control of the operation of the device 1, i.e. in particular of a particular function unit or units of the device 1 affected by the particular control parameter set, which control is adapted in respect of specific plant or process engineering configurations.

For example, the mass and/or inertia of the device 1 or of a mold 2 associated with the device 1 can be used as a parameter of the device. Selection of a certain control parameter set can thus take place based on the mass and/or inertia of the device 1 or of a mold 2 associated with the device. Alternatively or in addition, e.g. the thermal properties, in particular the thermal capacity, of the device 1 or of a mold 2 associated with the device can be used as parameters of the device 1. Selection of a certain control parameter set can thus take place based on the thermal properties, in particular the thermal capacity, of the device 1 or of a mold 2 associated with the device 1. Alternatively or in addition, e.g. a volume of a process chamber, i.e. e.g. of the mold cavity 2.3, of the device 1 can be used as a parameter of the device 1. Selection of a certain control parameter set can consequently take place based on a volume of a process chamber of the device 1. Alternatively or in addition, the geometric shape of a process chamber of the device 1—this applies in particular also in respect of the inflow and/or through-flow and/or discharge characteristics into, through or out of a process chamber of the device 1—can be used as a parameter of the device 1. Selection of a certain control parameter set can therefore take place based on the geometric shape of a process chamber of the device 1. A process chamber of the device 1 in all embodiments can be e.g. a mold cavity 2.3 of a mold 2 associated with the device 1, a process fluid supply device 3 associated with a mold 2 of the device 1, such as e.g. a steam chamber, or a plastic particle and/or process fluid line of a plastic particle and/or process fluid conducting device associated with a mold 2 of the device 1.

At least one chemical and/or physical process parameter, in particular a process temperature, a process pressure, a process humidity, a process atmosphere and/or a number of cycles can be used as a parameter of the work or production process to be implemented by means of the device 1. Selection of a certain control parameter set can thus take place on the basis of at least one chemical and/or physical process parameter and/or a number of cycles.

At least one chemical and/or physical material parameter, in particular the chemical composition, the particle size and/or shape, the density, the temperature, the moisture content, the flow properties, in particular in a conveying or transport flow, can be used as a parameter of the plastic particles to be processed by means of the device 1. Selection of a certain control parameter set can consequently take place on the basis of at least one chemical and/or physical material parameter.

According to the method, prior to selection of the at least one control parameter set and if applicable prior to provision of at least one selection criterion, provision can take place of a suitable data storage unit 6, in which a plurality of control parameter sets are saved or stored comprising at least one control parameter in each case for controlling the operation of at least one function unit of the device 1 in respect of at least one target value.

The method can also comprise changing or adapting at least one control parameter set saved or stored in the data storage unit 6. According to the method, changes or adaptations of at least one control parameter set saved or stored in the data storage unit 6 can therefore take place and/or changed or adapted control parameter sets can be saved or stored in the data storage unit 6. Appropriate changes or adaptations can be carried out e.g. on the basis of or taking into consideration measurement or sensor values of certain process parameters, signs of wear of certain function units of the device 1 etc. Appropriate measurement or sensor values can be taken from the operation of the device 1 to be controlled according to the method or another device for producing a particle foam component, in particular a device for producing a particle foam component that is configured similarly or identically to the device 1 to be controlled according to the method. It is also conceivable that appropriate measurement or sensor values can be taken from at least one local or global database unit, so that if applicable external data also can be used to change or adapt at least one control parameter set saved or stored in the data storage unit 6. No limits are thus set on the realization of an individual or tailored control response in respect of certain plant or process engineering configurations.

According to the method, at least one control parameter set can be saved or stored in the data storage unit 6 and accordingly selected and applied, which set relates to an operating parameter of at least one function unit of the device as control parameter, and/or which relates to a process parameter of at least one work process to be implemented by means of the device 1 as control parameter (first control parameter set below). Depending on the specific implementation of a function unit of the device 1 to be controlled during its operation, a corresponding operating parameter can be, for example, a force or power that can be generated via the function unit or a movement of the function unit resulting from this. Consequently e.g. a force and/or power production or a movement of a function unit of the device 1 can be controlled specifically on the basis of a first control parameter set. Thus e.g. at least one movement parameter or a movement function or characteristic curve progressing e.g. in a ramp-like manner of a movably mounted function unit or of a function element of such a unit and/or a drive parameter or a drive function progressing e.g. in a ramp-like manner, in particular an actual position parameter, of a function unit or of a drive device of such a unit can be used as an operating parameter at least of one function unit of the device 1. A corresponding drive parameter or a corresponding drive function can also accompany a certain power or power take-up of a function unit that is controllable during its operation. Conceivable in this connection is e.g. a drive or conveying output of a drive or conveying device, such as e.g. a screw conveyor, delivery pump etc., wherein which start-up ramps are implemented between two power levels, such as e.g. between two speeds, can e.g. be controlled via a corresponding first control parameter set.

Alternatively or in addition, at least one control parameter set, which relates to a higher-level target value setting (second control parameter set below), can be saved or stored according to the method in the data storage unit and accordingly selected and applied. In contrast to a first control parameter set, a second control parameter set thus serves not to control the actual operation of a function unit of the device 1, but to implement a higher-level target value setting, which is taken as the basis for the actual control of the operation of the particular function unit of the device 1.

It is thus possible for the specific example of pressure control in a mold cavity 2.3 of a mold 2 of the device 1 that in the case of a pressure difference between an actual value and a target value, a higher-level target value setting is defined via a second control parameter set, in particular based purely on software, for a pressure limiting device 2.5 as an example of a function unit of the device 1 and control e.g. of the movement of the pressure limiting device 2.5, i.e. e.g. of a movably mounted pressure limiting element of the pressure limiting device 2.5, is carried out via a first control parameter set. In connection with the above example of a function unit of the device 1, in the form of a drive or conveying device, which is controllable during its operation, the dynamics with which control is to take place from an actual value to a target value can be defined e.g. at a higher level via a corresponding second control parameter set, and the actual operation of the drive or conveying device can be controlled via a corresponding first control parameter set on the basis of the dynamics set via the first second control parameter set.

In principle, the method can accordingly include setting of at least one item of target value information, which affects control of the operation of a function unit of the device 1 that is controllable during its operation and which describes at least one target value, in particular information in the form of a target value function or curve, and application of the target value information for controlling the operation of the function unit of the device 1 affected by the particular target value information. For example, for certain work processes, such as e.g. rapid filling of a mold cavity 2.3 of a mold 2 of the device 1 with plastic particles and/or a process fluid, with regard to which e.g. the speed alone is definitive, temporary circumvention of control is possible in this way. This can be carried out in particular for repetitive work processes such as e.g. corresponding filling processes.

A relevant item of target value information can be determined e.g. on the basis of information determined by measuring processes of the target value described by the particular target value information and/or on the basis of information determined by calculation and/or simulation processes of the target value described by the particular target value information and/or on the basis of information taken from an external database. Corresponding calculation and/or simulation processes can be carried out on the basis of plant or process engineering parameters. Corresponding target value information can be saved or stored in the data storage unit 6, if applicable after in particular iterative adaptation.

Figure 2:
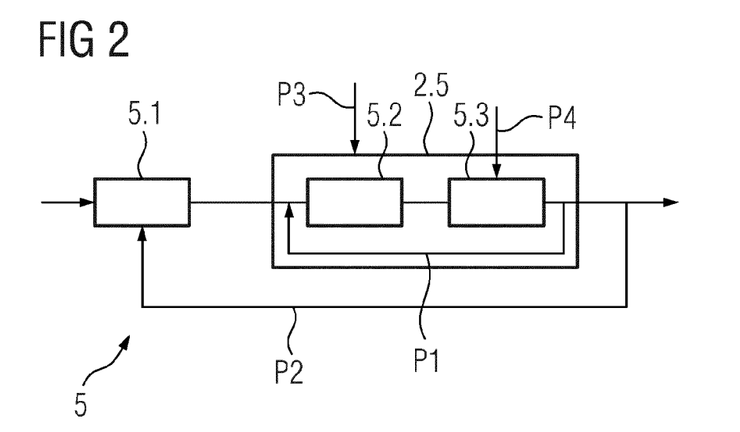
FIGS. 2, 3 respectively a schematic representation of a control device according to an exemplary embodiment.
Figure 3:
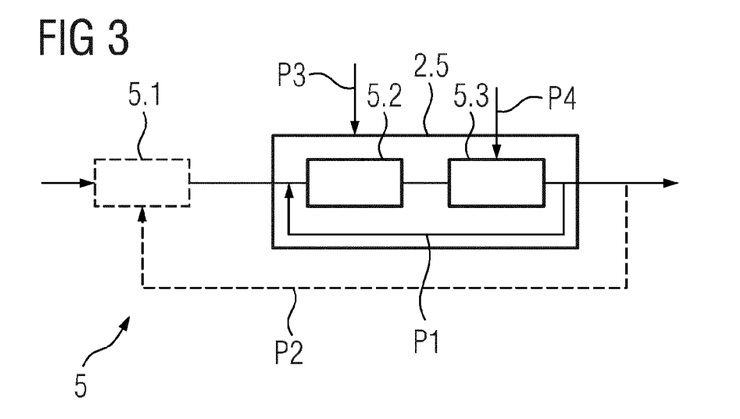

FIGS. 2, 3 each show a schematic diagram of a control device 5 according to an exemplary embodiment.

It is first evident based on the exemplary embodiment shown in FIG. 2 that the control device 5 can comprise a first controller 5.1 implemented via hardware and/or software, which takes as the basis for control of the operation of a function unit of the device 1—in this context reference is again to be made by way of example to a pressure limiting device 2.5—a corresponding second control parameter set, which relates to a higher-level target value setting, and can comprise a second controller 5.2 implemented via hardware and/or software, which takes as the basis for control of the operation of the corresponding function unit of the device 1 a corresponding first control parameter set, which relates to an operating parameter of the function unit of the device 1 as a control parameter—in this context reference is to be made by way of example to a position of a movably mounted pressure limiting element of the pressure limiting device 2.5.

In the exemplary embodiment shown in FIG. 2, the output of the first controller 5.1 is connected to the input of the second controller 5.2. The output of the second controller 5.2 is connected to a box indicating a controlled system.

The arrow connection P1 indicates that a signal describing the actual position of the pressure limiting element of the pressure limiting device 5, the operation of which is to be controlled, is led back to the input of the second controller 5.2.

The arrow connection P2 indicates that a signal describing the actual pressure resulting from control of the pressure limiting device 5 is led back to the input of the first controller 5.1.

Disturbance variables are depicted by way of example by the arrows P3 and P4, furthermore, wherein the arrow P3 represents e.g. a disturbance variable in relation to the actual pressure, e.g. caused by a leak in a process chamber of the device 1, and the arrow P4 represents e.g. a disturbance variable in relation to a mechanical fault, e.g. caused by wear of the pressure limiting device 2.5.

It is evident based on the exemplary embodiment shown in FIG. 3 that the controller 5.1 can be temporarily deactivated in the case of a target value setting, which can, as mentioned, be e.g. a function of a certain parameter, such as e.g. time, pressure, temperature etc. Temporary deactivation of the controller 5.1 thus takes place in the period in which target value setting takes place. The temporary deactivation of the controller 5.1 is depicted in FIG. 3 by showing the box illustrating the controller 5.1 with dashed lines.

Figure 4:
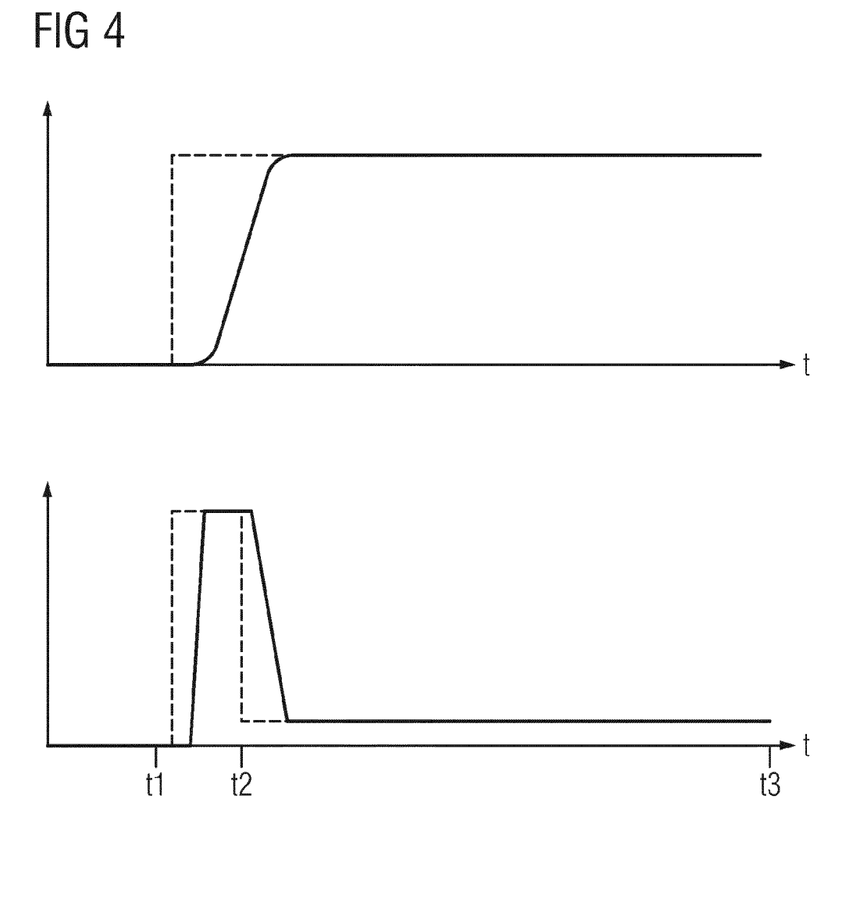
FIG. 4 a schematic representation of control of a valve stroke according to an exemplary embodiment.

For this FIG. 4 shows a schematic diagram of control of a valve stroke of a movably mounted pressure limiting element of a pressure limiting device 2.5 according to an exemplary embodiment with the aid of two graphs.

In the top graph, the curve of the pressure inside a process chamber of the device 1, i.e. e.g. inside a mold cavity 2.3 of the mold 2 of the device 1, is plotted on the x-axis and the time is plotted on the y-axis. The dashed line here depicts the target value setting for the pressure, the solid line depicts by way of example the actual value of the pressure.

In the bottom graph, the curve of the stroke of a movably mounted pressure limiting element of a pressure limiting device 2.5 correlated to the pressure inside the process chamber of the device 1, i.e. e.g. inside a mold cavity 2.3 of the mold 2 of the device 1, is plotted on the x-axis and the time is plotted on the y-axis. The dashed line here depicts the target value setting for the stroke of the pressure limiting element, the solid line depicts by way of example the actual value of the stroke of the pressure limiting element.

Control of the operation of the pressure limiting device 2.5 takes place here in the first time interval defined by the times $t_1$ and $t_2$ initially on the basis of target value information describing at least one target value, in particular information in the form of a target value function or curve. A rapid rise in the pressure inside the particular process chamber of the device 1 can be realized in this way. In the first time interval, control of the operation of the pressure limiting device 2.5 is thus temporarily bypassed.

In the second time interval defined between the times $t_2$ and $t_3$, control of the operation of the pressure limiting device 2.5 takes place on the basis of a control parameter set.

The invention claimed is:

1. A method for controlling the operation of a device for producing a particle foam component, wherein the device is configured to perform one or more work processes for processing particle foam material to produce a particle foam component, wherein the device comprises at least one function unit, which is controllable during its operation on basis of a control parameter set in respect of at least one target value, comprising:
    selecting, via at least one selection device, on the basis of at least one selection criterion, of a control parameter set, in which multiple predefined control parameters are contained for controlling the operation of at least one function unit of the device configured to perform one or more work processes for processing particle foam material to produce a particle foam component in respect of at least one target value, from a data storage unit, in which a plurality of predefined control parameter sets are stored, each comprising at least one predefined control parameter for controlling the operation of at least one function unit of the device in respect of at least one target value, wherein each predefined control parameter set comprises at least three predefined control parameters, wherein the at least three predefined control parameters comprise a P-, D- and I-parameter of a PID-controller;
    applying, via the at least one selection device, the at least one selected control parameter set that comprises the at least three predefined control parameters for controlling the operation of the function unit of the device affected by the particular control parameter set; and
    conducting, with the at least one function unit of the device, at least one work process which comprises processing of plastic particles of at least one plastic particle material to produce a particle foam component on basis of the applied at least one selected control parameter set that comprises the at least three predefined control parameters.

2. The method according to claim 1, wherein prior to selection of the control parameter set, provision of at least one selection criterion takes place.

3. The method according to claim 2, wherein a selection criterion is used, which
    relates to a parameter of the device, and/or
    relates to a parameter of the production process to be implemented by the device, and/or
    relates to a parameter of the plastic particle material to be processed by the device.

4. The method according to claim 3, wherein used as a parameter of the device is
    the mass and/or inertia of the device or of a mold associated with the device; and/or
    the thermal properties of the device or of a mold associated with the device; and/or
    a volume of a mold cavity of a mold associated with the device,
    the geometric shape of a mold cavity of a mold associated with the device.

5. The method according to claim 3, wherein at least one chemical and/or physical process parameter including a process temperature, a process pressure, a process humidity, a process atmosphere, and/or a number of cycles, is used as a parameter of the production process to be implemented by the device.

6. The method according to claim 3, wherein at least one chemical and/or physical material parameter, including the chemical composition, the particle size and/or shape, the density, the temperature, the moisture content, the flow properties is used as a parameter of the plastic particles to be processed by the device.

7. The method according to claim 1, further comprising changing or adaptation of at least one of control parameter set stored in the data storage unit.

8. The method according to claim 1, wherein at least one control parameter set is selected, which relates to an operating parameter of at least one function unit of the device as control parameter, and/or relates to a process parameter of the production process to be implemented by the device as control parameter.

9. The method according to claim 1, wherein at least one control parameter set is selected which relates to a superordinate target value setting.

10. The method according to claim 9, wherein a movement parameter of a movably mounted function element of the function unit and/or a drive parameter including an actual position parameter, of a drive device of at least one function unit of the device is used as an operating parameter of at least one function unit of the device.

11. The method according to claim 1, wherein an actuating device comprising at least one actuator element transferable to a first orientation and/or position, and to at least one other orientation and/or position, is used as a function unit of the device.

12. The method according to claim 11, wherein an actuating device forming a pressure limiting device for the introduction, if applicable in a pressurized manner, of a process medium into a mold cavity of a mold associated with the device, or associated with such a device, is used.

13. The method according to claim 1, wherein a control parameter set is selected for controlling a chemical parameter and/or physical parameter to be controlled in respect of a target value including the pressure and/or the temperature and/or the humidity, inside a process chamber of the device.

14. The method according to claim 1, wherein the selection by a user takes place manually and/or at least partially automatically by a selection device implemented via hardware and/or software.

15. The method according to claim 1, wherein the application of the selected control parameter set by a user takes place manually and or at least partially automatically by a selection device implemented via hardware and/or software.

16. The method according to claim 1, further comprising specification of target value information, which relates to control of the operation of at least one function unit of the device and describes at least one target value, which information is in particular in the form of a target value function or curve, and application of the target value information for controlling the operation of the device, in particular for controlling the operation of the function unit of the device affected by the particular target value information.

17. The method according to claim 16, wherein the target value information is determined on the basis of information determined by measuring processes of the target value described by the particular target value information and/or on the basis of information determined by calculation and/or simulation processes of the target value described by the particular target value information and/or on the basis of information taken from an external database.

18. The method according to claim 1, further comprising adaptation of at least one control parameter of at least one control parameter set in the context of operation of the device to produce an adapted control parameter set and storage of the adapted control parameter set in the data storage unit.

19. The method according to claim 1, wherein the control parameter sets are stored in the data storage unit classified according to at least one classification criterion.

20. A device for producing a particle foam component, comprising:
    at least one function unit, which is controllable during its operation in respect of at least one target value,
    at least one control device for applying at least one control parameter set selected from the data storage unit for controlling the operation of the device for controlling the operation of the function unit of the device affected by the particular control parameter set and for controlling the operation of a device for producing a particle foam component, wherein the device is configured to perform one or more work processes for processing particle foam material to produce a particle foam component in accordance with the method of claim 1.

* * * * *